(12) United States Patent
Sivalingam et al.

(10) Patent No.: US 11,948,232 B2
(45) Date of Patent: Apr. 2, 2024

(54) SYSTEM AND METHOD FOR VISUALIZING PROCESS INFORMATION IN INDUSTRIAL APPLICATIONS

(71) Applicant: ABB Schweiz AG, Baden (CH)

(72) Inventors: Raja Sivalingam, Genoa (IT); Matteo Sommariva, Genoa (IT); Giorgio Avanzino, Genoa (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/735,463

(22) Filed: May 3, 2022

(65) Prior Publication Data
US 2022/0358698 A1    Nov. 10, 2022

(30) Foreign Application Priority Data
May 4, 2021  (EP) .................................... 21172072

(51) Int. Cl.
*G06F 3/0482*    (2013.01)
*G06F 3/04847*    (2022.01)
*G06T 11/20*    (2006.01)
*G06F 3/0486*    (2013.01)

(52) U.S. Cl.
CPC .......... *G06T 11/206* (2013.01); *G06F 3/0482* (2013.01); *G06F 3/04847* (2013.01); *G06F 3/0486* (2013.01); *G06T 2200/24* (2013.01)

(58) Field of Classification Search
CPC .. G06F 3/0482; G06F 3/04847; G06F 3/0486; G06T 11/206; G06T 2200/24; G05B 19/0423; G05B 23/0216
See application file for complete search history.

(56) References Cited

U.S. PATENT DOCUMENTS

| | | | | |
|---|---|---|---|---|
| 5,644,487 A * | 7/1997 | Duff | ..................... | G05B 19/056 700/87 |
| 5,966,532 A * | 10/1999 | McDonald | ................ | G06F 8/34 717/113 |
| 7,680,546 B2 | 3/2010 | Gilbert et al. | | |
| 10,444,949 B2 | 10/2019 | Scott et al. | | |
| 10,824,126 B2 * | 11/2020 | Doppelhamer | .... | G05B 19/0423 |
| 10,895,968 B2 * | 1/2021 | Thiercelin | ............... | G06F 9/451 |
| 11,249,628 B2 * | 2/2022 | Uy | ..................... | G06F 3/04817 |

(Continued)

OTHER PUBLICATIONS

European Patent Office, Extended European Search Report in European Patent Application No. 21172072.7, 7 pp. (dated Nov. 11, 2021).

*Primary Examiner* — Rayeez R Chowdhury
(74) *Attorney, Agent, or Firm* — Leydig, Voit & Mayer, Ltd.

(57) ABSTRACT

A system and method for visualizing process information in industrial process applications, wherein the process information is comprised in data objects related to process elements and data objects are represented as visualized data objects according to pre-defined visualization styles, and wherein a data object is representable by a plurality of different visualization styles, includes running a visualization application for visualizing the process information, selecting a visualization style for a data object during run time of the visualization application, and applying the visualization style according to the selection during run time of the visualization application.

18 Claims, 3 Drawing Sheets

(56) References Cited

U.S. PATENT DOCUMENTS

| | | | | |
|---|---|---|---|---|
| 2005/0093868 A1* | 5/2005 | Hinckley | H04W 4/21 | 345/506 |
| 2007/0260982 A1* | 11/2007 | Wayland | G06F 9/451 | 715/700 |
| 2008/0104526 A1* | 5/2008 | Jaeger | G06F 3/0481 | 715/763 |
| 2008/0244449 A1* | 10/2008 | Morrison | G05B 23/0272 | 715/810 |
| 2012/0054650 A1* | 3/2012 | Bliss | G06F 3/04842 | 715/764 |
| 2012/0062489 A1* | 3/2012 | Andersson | G06F 3/04883 | 345/173 |
| 2014/0100668 A1* | 4/2014 | Jundt | G06F 3/0484 | 700/11 |
| 2014/0108985 A1* | 4/2014 | Scott | G05B 19/4188 | 715/771 |
| 2015/0052465 A1* | 2/2015 | Altin | G06F 3/04883 | 715/822 |
| 2015/0355611 A1* | 12/2015 | Laycock | G06F 3/0481 | 700/83 |
| 2017/0160901 A1* | 6/2017 | Strinden | G05B 19/10 | |
| 2017/0269696 A1* | 9/2017 | Naidoo | G06Q 10/06 | |
| 2017/0371528 A1* | 12/2017 | Cupitt | G06F 3/04883 | |
| 2022/0308533 A1* | 9/2022 | Robert | G06Q 10/00 | |

* cited by examiner

SYSTEM AND METHOD FOR VISUALIZING PROCESS INFORMATION IN INDUSTRIAL APPLICATIONS

CROSS-REFERENCE TO RELATED APPLICATIONS

This patent application claims priority to European Patent Application No. 21172072.7, filed on May 4, 2021, which is incorporated in its entirety herein by reference.

FIELD OF THE DISCLOSURE

The present invention relates to a method for visualizing process information in industrial process applications, a processing system, and a use of the processing system.

BACKGROUND OF THE INVENTION

Today's process graphics in an operator workplace are pre-defined and tightly integrated into applications like displays, faceplates, trends, historical reports, and alarm & event list. These process graphics are usually designed by engineers and added to the system for monitoring and controlling the desired process. If an operator wants to customize these displays, this is not possible or would require re-engineering of graphics, which is time consuming.

BRIEF SUMMARY OF THE INVENTION

A system and a method for improving the overall operator effectiveness may be desired. The problem is solved by the subject-matter described in the present disclosure. The described embodiments pertain to the method for representing process information of an industrial plant, a processing system, and a computer program element. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

BRIEF DESCRIPTION OF THE SEVERAL VIEWS OF THE DRAWING(S)

DETAILED DESCRIPTION OF THE INVENTION

Figure 1:
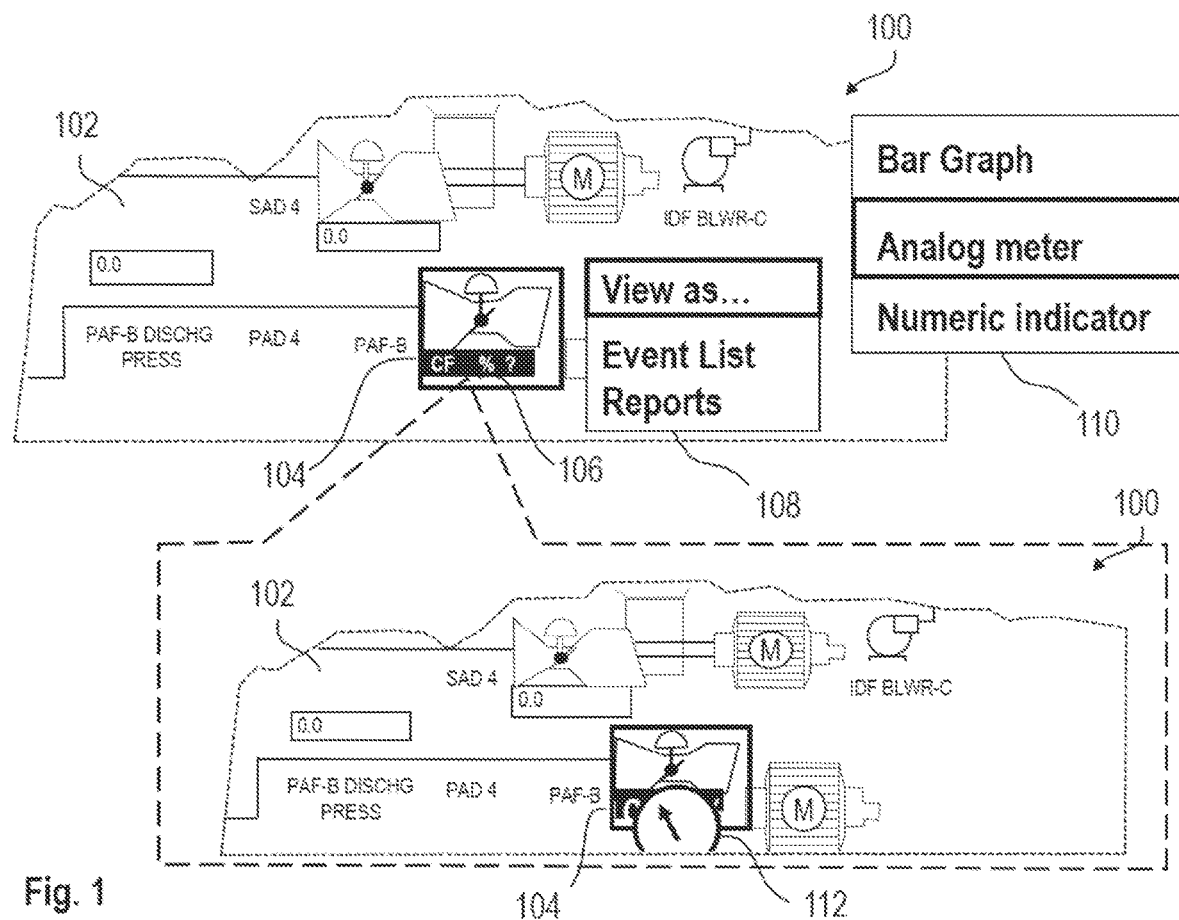
FIG. 1 shows a diagram of a visualization of an industrial process according to a first embodiment of the present disclosure.

FIG. 1 shows a diagram of a visualization 100 of an industrial process according to a first embodiment that is visualized by a visualization application. The visualization 100 of the system 102 comprises a plurality of process elements such as sensors, actors, lines, valves, etc. An operator may select one of these process elements, e.g. damper 104 as shown in the figure. Due to the selection, a menu 108 occurs, of which he selects the menu item "View as . . . ". Further possibilities would be to select "Event List" or "Reports". The selection of "View as . . . " results in showing a second menu 110 that offers three possible visualization styles for selection. These visualization styles are graphical representation of process element data as bar graph or analog meter or a numerical indication of process element data. The operator chooses "Analog meter" such that the display of the numerical indication 106 is transformed into the analog meter 112.

Figure 2:
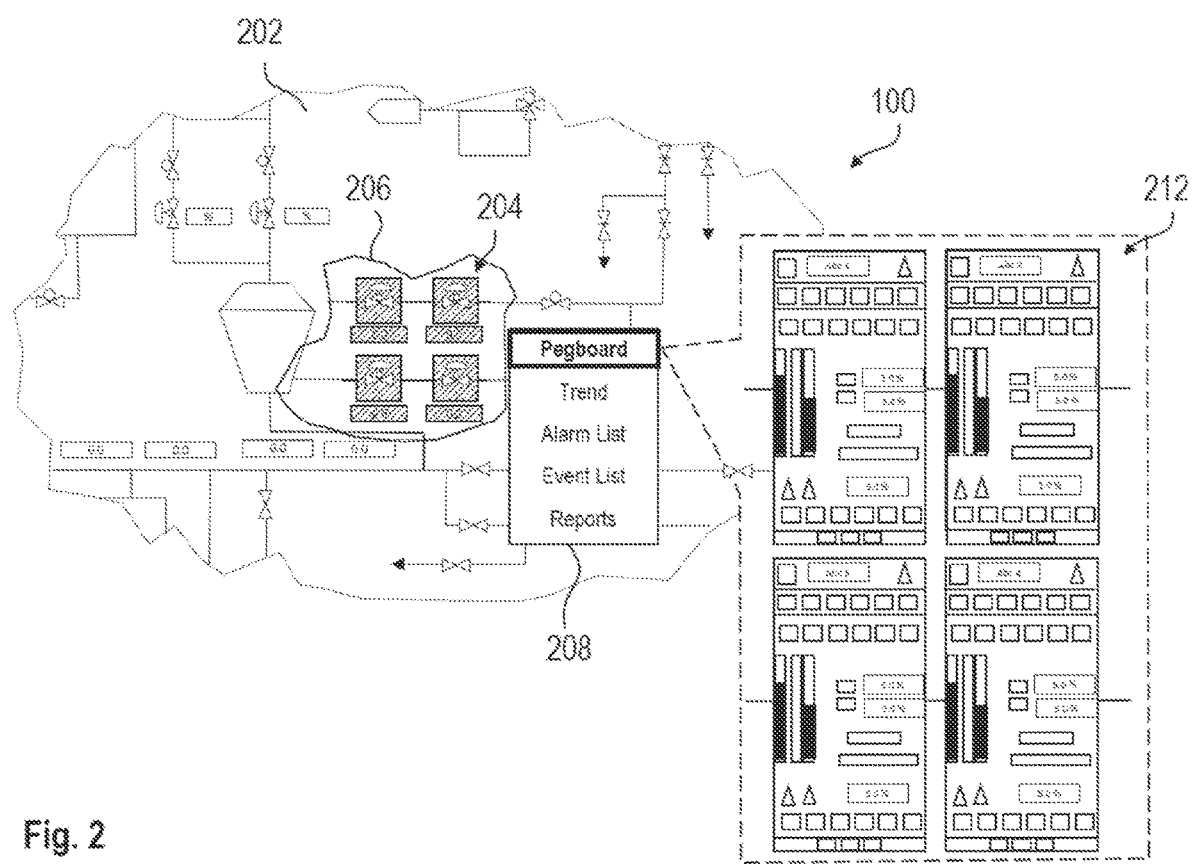
FIG. 2 shows a diagram of a visualization of an industrial process according to a second embodiment of the present disclosure.

FIG. 2 shows a further diagram of a visualization 100 of an industrial process according to a second embodiment that is visualized by a visualization application. The visualization 100 of the system 202 comprises again a plurality of process elements. An operator draws a freehand circle 206 around four valves 204 such that they are marked. Consequently, a menu 208 pops up showing the items "Pegboard" (embedded faceplates in the graphics), "Trend", "Alarm List", "Event List" and "Reports". When the operator selects "Pegboard", four windows 212 are opened, each of which shows one of the pegboard corresponding to one of the marked process elements. That is, the marking effects that all marked elements are treated in the same way without further operator actions. Further, the application knows, how many process elements have been marked such that it can arrange the windows in a clear non-overlapping way or arranged in a way that replicates graphic and/or logical connection as per valves 204.

Figure 3:
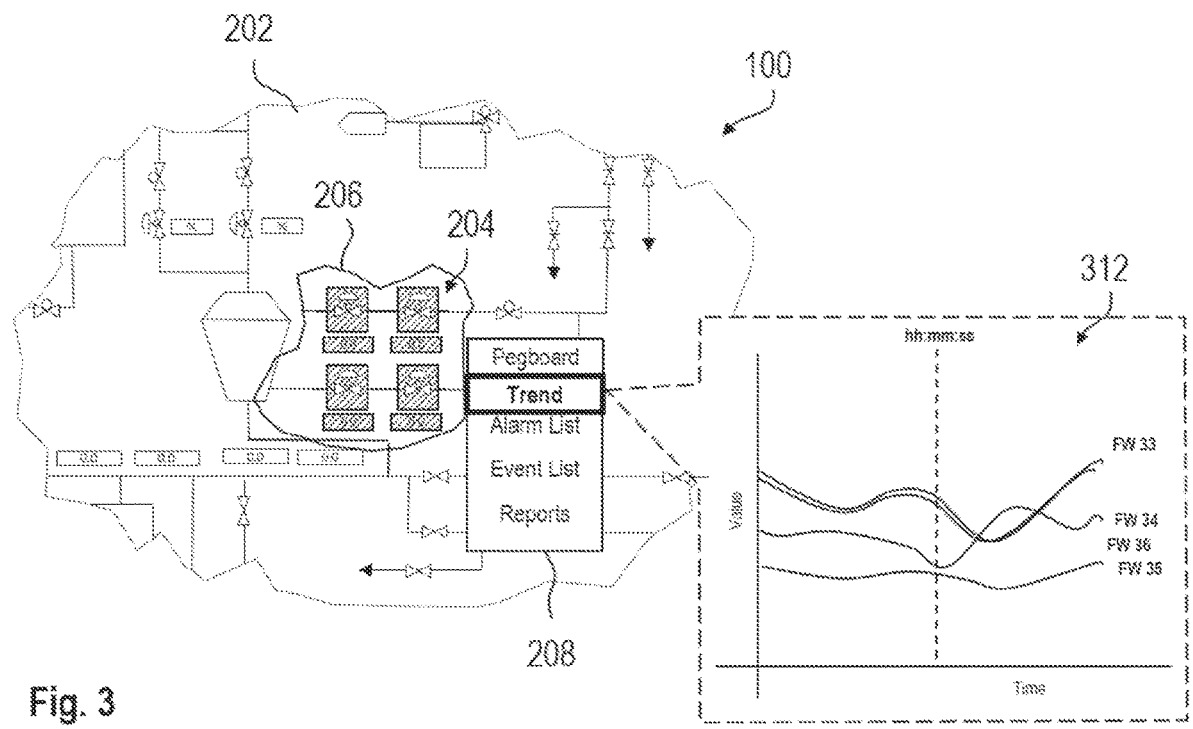
FIG. 3 shows a diagram of a visualization of an industrial process according to a third embodiment of the present disclosure.

FIG. 3 shows a diagram of a visualization 100 of an industrial process according to a third embodiment. The example is similar to that of FIG. 2, with the difference that the operator selects "Trend" from the menu "208" instead of "Pegboard". Consequently, a window pops up showing a diagram 312 with the trend, i.e. values over a time interval, of the marked process elements 204. It has to be noted the curves for all four process elements 204 are depicted in a single diagram 312.

Figure 4:
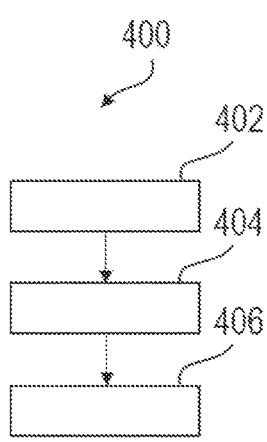
FIG. 4 is a flowchart for a method in accordance with the present disclosure.

FIG. 4 shows a flow diagram with the steps of the method 400 that represents process information of an industrial plant, wherein the process information is comprised in data objects related to process elements and data objects are represented according to pre-defined visualization styles. Such represented data objects are called visualized data objects in this disclosure. A data object is representable by a plurality of different visualization styles. The method 400 comprises the following steps: Running 402 a visualization application for visualizing the process information, selecting 404 a visualization style for a data object during run time of the visualization application, and applying 406 the visualization style according to the selection during run time of the visualization application 100.

Technical terms in the present disclosure are used according to their known and common meaning. If a specific meaning is conveyed to certain terms, definitions of terms will be given in the following in the context of which the terms are used.

According to a first aspect, a method for visualizing process information in industrial process applications is provided. The process information is comprised in data objects related to process elements of the industrial process application, data objects are represented as visualized data objects according to pre-defined visualization styles, and a data object is representable by a plurality of different visualization styles. The method comprises the following steps: running a visualization application for visualizing the process information and visualize data objects in a gadget window according to a stored configuration, selecting a visualization style for a data object differing from the current visualization style during run time of the visualization application, and changing the visualization style according to the selection during run time of the visualization application. The visualization application provides different visualization styles for a data object during run time of the visualization application for selection. "Selecting" is to be understood in this disclosure as selecting, by the human-machine interface, that is, by the visualization application, objects, styles, etc. in accordance with a user input or user selection.

A process of an industrial plant or an industrial application is usually visualized graphically by depicting process elements of the process such as lines, pipes or wires indicating flows of the process, vessels, actuators such as valves, motors, temperature regulating devices, switches, etc. The graphical visualization is essential for an effective management of interactions of an operator, who has to monitor and control the industrial process. For most of these process elements, designations are displayed and information such as values, e.g., measurement or process values, status information or control elements are available and represented in a certain arrangement, format or style. Further, there may be virtual process elements such as status, alarm or event indicators that may be not related to a single, distinct physical object, but that get their input from parameters of several physical elements. Such virtual (or "logical") and non-virtual elements are collectively designated as "process elements" in this disclosure.

The process of the industrial process application is based on an underlying industrial process system. Under the term "process information" the linked process elements together with the parameters of the elements is understood. Both components of such defined process information are visualized by the visualization application. The links of the process elements may be stored, for example, in the data objects related to the process elements, or in a separate link list. The data for each of the virtual and non-virtual elements is stored in data objects. The data may comprise temporary data such as parameter values or processed values, or fix data such as names, or images. For providing processed values, the data objects may comprise methods. Furthermore, data objects may comprise input variables that collect HMI input values or commands that are provided as control signals or are transformed into control signals for controllable elements such as actuators.

"Data object" is always understood to mean a data object that refers to process elements of the industrial process application. An equivalent term is "process object". "Visualized data object" is the displayed representation, e.g. showing a symbol of a valve, motor, etc.

The visualization application is an executable program that has an interface to the process elements and acts as HMI (human-machine-interface). It has access to at least one memory where the values of the elements and resources are stored, and where optionally configurations are stored.

A "visualization style" defines the way a data related to a process element is presented to an operator. Depending on the visualization style, complete, partial data of the data object is presented. physical process elements, however, may always be represented graphically at least by an icon or a symbol.

Technically, the visualization of a data related to a process element is provided by an application that is called "gadget" in this disclosure. That is, a gadget is responsible for displaying the data of a process element in a "view" or "window" and related actions such as updating the view according to, for example, a data polling interval or event, etc. This view or window for which a gadget is responsible is called "gadget window" in this disclosure. How the data is represented is defined by a visualization style. There may be different visualization styles for a gadget.

Gadgets thus are understood in this disclosure to be functional applications within the visualization application. The functionality of the gadgets may be, for example, showing live data numerically or in graphical design such as bars or status bars, a current state of switches or valves, diagrams showing parameter values by means of lines, curves, imitations of analog meters, and also diagrams showing current flows of circuits. Gadget items may further be interactive graphical elements such as menus such as dropdown-lists, check boxes, comment boxes such that an operator may also type comments, and control elements receiving input from the operator, such as bars, switches and turn buttons.

Data accessed by gadgets are represented in a gadget window. A gadget window is therefore a view of a gadget. Gadgets may be implemented based, for example, on configurations or as dynamical link libraries, such that an operator or a customer may be provided with optional specific libraries according to his needs.

The gadgets are running in parallel to the basic application frame such that they may work independently, and therefore they can listen to and react on user actions as well as on data updates in real time or near real time while presenting their gadget window, without influencing the application frame or other gadgets. The presented method thus involves on-the-fly visualization changes in the process graphics.

Thus, a method is presented that improves the overall operator effectiveness by providing means to operator for customizing the visualization in runtime.

According to an embodiment, the selection of a visualization style for a data object is a selection out of a set or a pool of context dependent visualization styles. That is, a number of pre-defined visualization styles are available for a given context. A context may be, for example, a type of underlying system, a process element type, a region or part of the underlying system, etc.

A visualization style related to a process element may use different data than another visualization style related to the same process element. For example, a "trend" visualizes values of process values over time. An "alarm", may show an imitated red LED. That is, the visualized data is different but, e. g, stored in a common data object related to the process element.

According to an embodiment, a visualization style comprises visualization parameters and the visualization parameters are configurable. Visualization parameters may be minimum and maximum values, e g., defining a time interval for displaying current and historical data, a scale of a coordinate system, a resolution in which data shall be displayed, a color for a data item, visual element or number, etc. These parameters may also be adapted by an operator to his needs in real time. For that, the operator may change these values before showing the gadget window, or preferably while showing the window. The modification may be done inside the window by for example providing a corresponding context menu.

According to an embodiment, the context dependent pool of visualization styles comprises pre-defined or user-defined visualization styles. Visualization styles that are completely different from existing visualization styles may be defined and added by the operator to the pool of visualization styles. Visualization styles may also be added to a library such that a visualization style of this library may be added to the context.

According to an embodiment, the selection of a visualization style is performed by drawing a free-form, providing a contextual menu based on selected visualized data objects, and launching a gadget configured to be launched with a data object, without using drag-and-drop.

According to an embodiment, the selection of a visualization style is performed by drawing a free-form, dragging-and-dropping it to any already open gadget, wherein a gadget configured to be launched with a data object is already launched, wherein the gadget is updated with drag-and-dropped visualized data objects and wherein the gadget shows the process information according to the update. For example, a trend gadget already showing a visualized data object is now updated with process objects, i.e., visualized data objects identified in the menu list.

The selection of a visualization style may be performed by selecting an item from a menu, dragging items within a gadget window, or dragging and dropping an item into a gadget window. A menu may be realized, for example, as list or a drop down menu, or any type known to a skilled person. By drag and drop methods, a quick and easy visualization and a quick identification of cross application launching methods (i.e. selecting set of tags and launching trend) is provided. When dragging and dropping an item into a gadget window, for example a set of items may be provided in the application window similar to a tool set. Such an item may for example represent an alarm or event list, an analog meter, etc.

The gadget window may represent multiple process elements. That is, that data comprised in more than one data object is represented. This may be handled by a gadget associated to one of the involved process elements or by a gadget that is independent of a distinct process element.

The visualization styles may be combinable in one gadget window. That is, the operator may, for example, select a first and a second visualization style, and both are shown in a combined window, or the second visualization style may be added at any time later. For example, a list of numerical values may be added to a curve, or in the window of the "Trend" gadget, an alarm LED may be added. Alternatively, two visualization styles may be shown in separate gadget windows.

According to an embodiment, the visualization styles comprise numerical or graphical representations. Numerical representations may be for example single values, lists or tables, and graphical representations may be imitated analog displays, bars, diagrams, color coded representations etc.

According to an embodiment, the gadget window represents a control interface for controlling process elements. The graphical control interface allows controlling process parameters, switches, valves or any other controllable process elements. Parameters and representations of a parameter to control a process element may be added or modified on the fly by the operator. For example, the operator may define maximum or minimum values in which a parameter is allowed to be specified, or whether a switch may be extended having three states instead of two states, or, e.g., having a turn button instead of a sliding bar etc. to set a value, etc.

According to an embodiment, visualized data objects of process elements such as pipes, actuators, valves, switches etc., are represented as an icon or symbol, and by selecting an icon, a context menu is opened for selecting the visualization style.

According to an embodiment, the context menu provides at least one of the following items: pegboard, trend, alarm list, event list, and reports. Accordingly, when selecting "pegboard", information as alarms or events, process values and/or control elements for a process element are shown in the gadget window. A "trend" may show a history of values of a parameter in a time interval, e.g., in a diagram. Further, it may show expected future values. Alarm list and event list may list alarms and events as a list or table, and a report may show a log file, wherein the log file may be filtered according to selectable or configurable aspects.

According to an embodiment, the method step selecting a visualization style for a data object during run time of the visualization application comprises selecting a plurality of visualized data objects to be visualized according to the visualization style.

In the basic graphic comprising the linked process elements of the industrial plant or system, at least some of the depicted elements or objects interactively respond to, e.g., a mouse button pressed or mouse-over condition, a touch of a finger or a pen, or any other known HMI-methods. As interactive response, an element or object may be marked as selected, such that several elements or objects may be selected contemporarily. Alternatively, a free closed curve may be drawn, e.g. using a pen, a finger, or a mouse for selecting a several elements. When the selection is finished, e.g. in the moment when the curve is closed or by a mouse click, a context menu may pop up for selecting the next action. By this next action, a visualization style of data related to the selected process elements or objects may be chosen and a gadget may be invoked handling the display, which shows the data relating to the selected process elements contemporarily in a clear way, e.g. in a row or in matrix form. Alternatively, instead of invoking a single gadget, the gadgets related to each of the selected process elements may be invoked, wherein a coordination mechanism ensures the clear representation.

Optionally, visualization styles are combinable in one gadget window. In this way, numerical elements and graphical elements of the same or different data or parameter may be displayed in the same gadget window.

According to an embodiment, pegboards are launched with identified visualized data objects related to process elements of the industrial process application in a menu, and the identified visualized data objects are automatically arranged such that they do not overlap each other. The identification of the visualized data objects may be performed by a user selection.

According to an embodiment, faceplates are arranged in such a manner that the arrangements are based on a logical connection between the identified visualized data objects.

According to an embodiment, a current visualization configuration is stored. The visualization configuration is the current configuration of the gadget windows. A customized gadget window may be stored such that an operator may select it any time again such that the next time the operator could call the visualization application with original view or call the view of visualization application customized by him. Further, it may be stored as a preferred visualization configuration such that it may be used as a default configuration.

According to a second aspect, a processing system is provided that is configured to execute the steps of the method described herein.

According to a third aspect, a use of the processing system according to the second aspect for industrial process applications is provided. The process application may be, for example an application in an industrial plant or process plant.

Further, a computer program element may be provided, which when being executed on such a processing system instructs the processing system to perform the steps of the method described herein. The computer program element may be part of a computer program, but it can also be an entire program by itself. For example the computer program element may be used to update an already existing computer program to get to the present invention.

These and other features, aspects and advantages of the present invention will become better understood with reference to the accompanying figure and the following description. Identical or equivalent elements are in principle provided with the same reference signs.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for visualizing process information in industrial process applications, comprising:
   providing the process information, wherein the process information comprises in data objects related to process elements of the industrial process application;
   representing a data object as a visualized data object according to at least one of a plurality of pre-defined visualization styles, wherein each visualized data object corresponds to an individual process element;
   running a visualization application for visualizing the process information, wherein the visualization application provides a visualization of an industrial process system comprising each visualized data object arranged based on connections between the process elements;
   selecting, from at least one option in a selection presented simultaneously with the visualization, a visualization style for the data object in the same visualization of the industrial process system during run time of the visualization application; and
   applying the visualization style to the arranged visualized data object within the same visualization according to the selection during run time of the visualization application.

2. The method according to claim 1, wherein the selection presented simultaneously with the visualization is a selection out of a pool of context dependent visualization styles.

3. The method according to claim 1, wherein the visualization style comprises visualization parameters and the visualization parameters are configurable.

4. The method according to claim 2, wherein the context dependent pool of visualization styles comprises pre-defined or user-defined visualization styles.

5. The method according to claim 1, wherein the selection of the visualization style is performed by drawing a free-form, providing a contextual menu based on selected visualized data objects, and launching a gadget configured to be launched with a data object, without using drag-and-drop.

6. The method according to claim 1, wherein the selection of the visualization style is performed by drawing a free-form, wherein a gadget configured to be launched with a data object is already launched, wherein the gadget is updated with drag-and-dropped visualized data objects and wherein the gadget shows the process information according to the update.

7. The method according to claim 1, wherein the visualized objects are visualized with a gadget window, and the gadget window represents a control interface.

8. The method according to claim 1, wherein the visualized data objects are represented as an icon or symbol, and wherein by selecting the icon or symbol the selection comprising a context menu is opened for selecting the visualization style.

9. The method according to claim 8, wherein the context menu provides at least one of the following items: pegboard, trend, alarm list, event list, and reports.

10. The method according to claim 1, wherein selecting the visualization style for the data object comprises selecting a plurality of visualized data objects to be visualized according to the visualization style.

11. The method according to claim 1, wherein pegboards are launched with identified visualized data objects in a menu, and the identified visualized data objects are arranged automatically such that they do not overlap each other.

12. The method according to claim 11, wherein faceplates are arranged in such a manner that the arrangements are based on a logical connection between the identified visualized data objects.

13. The method according to claim 1, wherein, after the step of selecting the visualization style for the data object during run time of the visualization application, the selected visualization style is stored.

14. A non-transitory computer-readable medium having processor-executable instructions stored thereon, wherein the processor-executable instructions, when executed by one or more controllers, facilitate:

providing process information, wherein the process information comprises in data objects related to process elements of the industrial process application;

representing a data object as a visualized data object according to at least one of a plurality of pre-defined visualization styles, wherein each visualized data object corresponds to an individual process element;

running a visualization application for visualizing the process information, wherein the visualization application provides a visualization of an industrial process system comprising each visualized data object arranged based on connections between the process elements;

selecting, from at least one option in a selection presented simultaneously with the visualization, a visualization style for the data object in the same visualization of the industrial process system during run time of the visualization application; and applying the visualization style to the arranged visualized data object within the same visualization according to the selection during run time of the visualization application.

15. The method according to claim 1, the selection comprising a pool of visualization styles available for the data object, and wherein the method further comprises:

providing, in response to selecting the visualized data object, the pool of visualization styles simultaneously with the arrangement of the visualized data objects within the same visualization of the visualization application.

16. The method according to claim 1, wherein the method further comprises:

providing, in response to selecting the visualization style, the visualized data objects within the same visualization of the visualization application.

17. The method according to claim 1, wherein representing the data object by the plurality of the different pre-defined visualization styles further comprises:

representing the data object by a first visualization style of the plurality of the different pre-defined visualization styles, and wherein applying the visualization style to the visualized data object further comprises:

replacing the first visualization style with the selected visualization style.

18. The method according to claim 15, wherein applying the visualization style to the arranged visualized data object according to the selection during run time of the visualization application is based on the selected visualization style.

* * * * *